US012548509B2

(12) United States Patent
Yuan et al.

(10) Patent No.: US 12,548,509 B2
(45) Date of Patent: Feb. 10, 2026

(54) PIXEL DRIVING CIRCUIT AND DRIVING METHOD THEREFOR, AND DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Xiaomin Yuan, Beijing (CN); Huaisen Ren, Beijing (CN); Yonglin Guo, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/704,430

(22) PCT Filed: May 10, 2023

(86) PCT No.: PCT/CN2023/093267
§ 371 (c)(1),
(2) Date: Apr. 24, 2024

(87) PCT Pub. No.: WO2023/221834
PCT Pub. Date: Nov. 23, 2023

(65) Prior Publication Data

US 2025/0006126 A1 Jan. 2, 2025

(30) Foreign Application Priority Data

May 20, 2022 (CN) ........................ 202210556932.9

(51) Int. Cl.
*G09G 3/3233* (2016.01)

(52) U.S. Cl.
CPC ....... *G09G 3/3233* (2013.01); *G09G 2310/08* (2013.01); *G09G 2330/023* (2013.01)

(58) Field of Classification Search
CPC ............... G09G 3/3233; G09G 3/3225; G09G 2310/08; G09G 2310/0264; G09G 2330/023; G09G 2330/021
See application file for complete search history.

(56) References Cited

U.S. PATENT DOCUMENTS

| | | | | |
|---|---|---|---|---|
| 9,286,832 | B2 * | 3/2016 | Park | G09G 3/3291 |
| 9,524,670 | B2 * | 12/2016 | Park | G09G 3/3233 |

(Continued)

FOREIGN PATENT DOCUMENTS

| | | | |
|---|---|---|---|
| CN | 106910457 | A | 6/2017 |
| CN | 107564466 | A | 1/2018 |

(Continued)

OTHER PUBLICATIONS

International Search Report for PCT/CN2023/093267 Mailed Aug. 18, 2023.

*Primary Examiner* — David Tung
(74) *Attorney, Agent, or Firm* — Ling Wu; Stephen Yang; Ling and Yang Intellectual Property

(57) ABSTRACT

A pixel driving circuit and a driving method therefor, and a display panel and a display apparatus. The pixel driving circuit comprises a write-in transistor, a driving transistor, a storage capacitor, a coupling capacitor and a light-emitting unit, wherein one electrode of the storage capacitor and a gate electrode of the driving transistor are both electrically connected to a first node; and one electrode of the coupling capacitor is electrically connected to a control voltage end, and the other electrode thereof is electrically connected to the first node, and the coupling capacitor is configured to adjust the voltage of the first node in a light emission phase, (Continued)

such that the voltage of the first node is converted from a first voltage into a second voltage.

14 Claims, 6 Drawing Sheets

(56) References Cited

U.S. PATENT DOCUMENTS

| | | | | |
|---|---|---|---|---|
| 9,823,729 | B2 * | 11/2017 | An | G09G 3/3233 |
| 11,087,678 | B2 * | 8/2021 | Park | H10D 86/441 |
| 11,839,112 | B2 * | 12/2023 | Yoon | H10D 86/471 |
| 2013/0201172 | A1 * | 8/2013 | Jeong | G09G 3/3258<br>345/82 |
| 2015/0255523 | A1 * | 9/2015 | Her | H10K 59/1213<br>345/76 |
| 2022/0044634 | A1 * | 2/2022 | Ka | G09G 3/3258 |

FOREIGN PATENT DOCUMENTS

| | | | |
|---|---|---|---|
| CN | 112562588 | A | 3/2021 |
| CN | 113823226 | A | 12/2021 |
| CN | 114155814 | A | 3/2022 |
| CN | 114222615 | A | 3/2022 |
| CN | 114724514 | A | 7/2022 |

* cited by examiner

PIXEL DRIVING CIRCUIT AND DRIVING METHOD THEREFOR, AND DISPLAY PANEL AND DISPLAY APPARATUS

CROSS-REFERENCE TO RELATED APPLICATIONS

The present application is a U.S. National Phase Entry of International Application PCT/CN2023/093267 filed on May 10, 2023, which claims priority of Chinese patent application No. 202210556932.9, filed to the CNIPA on May 20, 2022 and entitled "Pixel Driving Circuit and Driving Method Therefor, and Display Panel and Display Apparatus", which are hereby incorporated herein by reference in their entireties.

TECHNICAL FIELD

Embodiments of the present disclosure relate to, but are not limited to, the field of display technologies, in particular to a pixel driving circuit and a driving method therefor, a display panel, and a display apparatus.

BACKGROUND

For a display apparatus, how to reduce power consumption has been a research problem. For an OLED display scheme, one of the schemes to reduce power consumption is to reduce a cross-voltage between VDD (power supply positive voltage) and VSS (power supply negative voltage).

However, with a decrease of a cross-voltage between VDD and VSS, a data voltage range (a voltage range of a data signal) will decrease, which makes some gray scales unable to be displayed. For example, in a L255 display apparatus, reducing the cross-voltage between VDD and VSS will reduce a data voltage required by the L255, which may be a negative value, and at this time, the chip cannot correspond and thus cannot display.

SUMMARY

The following is a summary of subject matter described herein in detail. This summary is not intended to limit the protection scope of claims.

In a first aspect, an embodiment of the present disclosure provides a pixel driving circuit, including:

- a writing transistor, wherein a gate of the writing transistor is configured to be electrically connected to a gate signal terminal, a first electrode of the writing transistor is configured to be electrically connected to a data signal terminal, and a second electrode of the writing transistor configured to be coupled to a first node, and the writing transistor is configured to write a data voltage input from the data signal terminal to the first node in response to a gate signal input from the gate signal terminal such that a voltage of the first node is a first voltage;
- a storage capacitor, wherein one plate of the storage capacitor is configured to be electrically connected to a first power supply terminal, the other plate of the storage capacitor is configured to be electrically connected to the first node, and the storage capacitor is configured to store a voltage of the first node;
- a coupling capacitor, wherein one plate of the coupling capacitor is configured to be electrically connected to a control voltage terminal, the other plate of the coupling capacitor is configured to be electrically connected to the first node, and the coupling capacitor is configured to adjust the voltage of the first node during a light emitting stage so that the voltage of the first node is converted from the first voltage to a second voltage;
- a drive transistor, wherein a gate of the drive transistor is configured to be electrically connected to the first node, a first electrode of the drive transistor is configured to be coupled with the first power supply terminal, a second electrode of the drive transistor is configured to be coupled with one end of a light emitting unit, and the drive transistor is configured to generate a drive current during the light emitting stage according to the second voltage and a first power supply voltage input from the first power supply terminal; and
- the light emitting unit, wherein the other end of the light emitting unit is configured to be electrically connected to a second power supply terminal, and the light emitting unit is configured to emit light under driving of the drive current.

In an exemplary embodiment, the writing transistor and the drive transistor are both P-type transistors, and the coupling capacitor is configured to pull down the voltage of the first node in the light emitting phase in response to a voltage control signal.

In an exemplary embodiment, the pixel driving circuit further includes:

- a first light emitting control transistor, wherein a gate of the first light emitting control transistor is configured to be electrically connected to a light emitting control terminal, a first electrode of the first light emitting control transistor is configured to be electrically connected to the first power supply terminal, a second electrode of the first light emitting control transistor is configured to be electrically connected to a second node, and the first light emitting control transistor is configured to be turned on in response to a light emitting control signal input from the light emitting control terminal to make the first power supply voltage be written into the second node, and the second node is electrically connected to the first electrode of the drive transistor;
- a second light emitting control transistor, wherein a gate of the second light emitting control transistor is configured to be electrically connected to the light emitting control terminal, a first electrode of the second light emitting control transistor is configured to be electrically connected to a third node, a second electrode of the second light emitting control transistor is configured to be electrically connected to a fourth node, and the second light emitting control transistor is configured to be turned on in response to the light emitting control signal to make a voltage of the third node be written into the fourth node; wherein the third node is electrically connected to the second electrode of the drive transistor, and the fourth node is electrically connected to the first end of the light emitting unit;
- a switching transistor, wherein a gate of the switching transistor is configured to be electrically connected to the gate signal terminal, a first electrode of the switching transistor is configured to be electrically connected to the first node, a second electrode of the switching transistor is configured to be electrically connected to the third node, and the switching transistor is configured to be turned on in response to the gate signal to make a voltage of the third node be written into the first node;

a first reset transistor, wherein a gate of the first reset transistor is configured to be electrically connected to a reset control terminal, a first electrode of the first reset transistor is configured to be electrically connected to the first node, a second electrode of the first reset transistor is configured to be electrically connected to a reset signal terminal, and the first reset transistor is configured to be turned on in response to a reset control signal input from the reset control terminal to make a reset voltage input from the reset signal terminal be written into the first node; and a second reset transistor, wherein a gate of the second reset transistor is configured to be electrically connected to the reset control terminal, a first electrode of the second reset transistor is configured to be electrically connected to the fourth node, a second electrode of the second reset transistor is configured to be electrically connected to the reset signal terminal, and the second reset transistor is configured to write the reset voltage into the fourth node in response to the reset control signal.

In an exemplary embodiment, the light emitting control signal is also used as the voltage control signal.

In an exemplary embodiment, a capacitance value of the coupling capacitor is greater than or equal to 2 fF (flying farad).

In an exemplary embodiment, a capacitance value of the coupling capacitor is less than or equal to 10 fF (flying farad).

In a second aspect, an embodiment of the present disclosure provides a display panel, including a base substrate and the above-described pixel driving circuit located at a side of the base substrate.

In an exemplary embodiment, the display panel includes:

a multiplexing electrode located at a side of the base substrate and including a first region and a second region;

a storage electrode, wherein a first dielectric layer is provided between the storage electrode and the multiplexing electrode, the storage electrode is located at a side of the multiplexing electrode away from the base substrate, and an orthographic projection of the storage electrode on the base substrate is overlapped with an orthographic projection of the first region of the multiplexing electrode on the base substrate to form the storage capacitor; and a coupling capacitor, wherein a second dielectric layer is provided between the coupling electrode and the multiplexing electrode, the coupling capacitor is located at the side of the multiplexing electrode away from the base substrate, and an orthographic projection of the coupling capacitor on the base substrate is overlapped with an orthographic projection of the second region of the multiplexing electrode on the base substrate to form the coupling capacitor.

In an exemplary embodiment, the display panel includes:

an active layer located at a side of the base substrate;

a first gate insulation layer located at a side of the active layer away from the base substrate;

a first gate layer including a plurality of gate lines, a plurality of light emitting control lines and a plurality of multiplexing electrodes, wherein the gate lines and the light emitting control lines are alternately arranged;

a second gate insulation layer located at a side of the first gate layer away from the base substrate and also used as the first dielectric layer and the second dielectric layer; and a second gate layer including a plurality of storage electrodes and a plurality of coupling electrodes, wherein the coupling electrodes are electrically connected to the light emitting control lines.

In an exemplary embodiment, the display panel includes:

an active layer located at a side of the base substrate;

a first gate insulation layer located at a side of the active layer away from the base substrate;

a first gate layer located at a side of the first gate insulation layer away from the base substrate and including a plurality of gate lines, a plurality of light emitting control lines and a plurality of multiplexing electrodes, wherein the gate lines and the light emitting control lines are alternately arranged;

a second gate insulation layer located at a side of the first gate layer away from the base substrate and also used as the first dielectric layer;

a second gate layer including a plurality of storage electrodes;

an interlayer insulation layer located at a side of the second gate layer away from the base substrate, wherein the interlayer insulation layer and the second gate insulation layer are also used as the second dielectric layer; and a source-drain electrode layer including a source electrode, a drain electrode and a coupling electrode, wherein the coupling electrode is electrically connected to a light emitting control line through a via hole penetrating through the interlayer insulation layer and the second gate insulation layer.

In an exemplary embodiment, a planarization layer, an anode layer, a pixel definition layer, a light emitting layer, and a cathode layer are arranged sequentially in a direction of the source-drain electrode layer away from the base substrate, wherein the anode layer includes a plurality of anode units, each of the anode units is electrically connected to a second electrode of a drive transistor in one pixel driving circuit, and the cathode layer is electrically connected to the second power supply terminal.

In an exemplary embodiment, the display panel further includes a buffer layer located between the base substrate and the active layer; and an encapsulation layer located at a side of the cathode layer away from the light emitting layer.

In a third aspect, an embodiment of the present disclosure provides a display apparatus including the above-described display panel.

In a fourth aspect, an embodiment of the present disclosure provides a driving method for driving the above-described pixel driving circuit, and the driving method includes:

a data writing stage, wherein during the data writing stage, the writing transistor writes a data voltage into a first node in response to the gate signal; and a light emitting stage, wherein during the light emitting stage, the coupling capacitor makes a second adjustment to the voltage of the first node to adjust the drive current generated by the drive transistor, so that the light emitting unit emits light under the driving of the drive current.

In an exemplary embodiment, the driving method further includes:

a voltage reset stage, wherein during the voltage reset stage, the first reset transistor writes a voltage reset voltage into the first node in response to the reset control signal, and the second reset transistor writes the voltage reset voltage to the fourth node in response to the reset control signal.

Other aspects of the present disclosure may be comprehended after the drawings and the detailed descriptions are read and understood.

BRIEF DESCRIPTION OF DRAWINGS

The abovementioned and/or additional aspects and advantages of the embodiments of the present disclosure will become clear and easily understandable from the following descriptions made to the embodiments with reference to the drawings.

DETAILED DESCRIPTION

Figure 1:
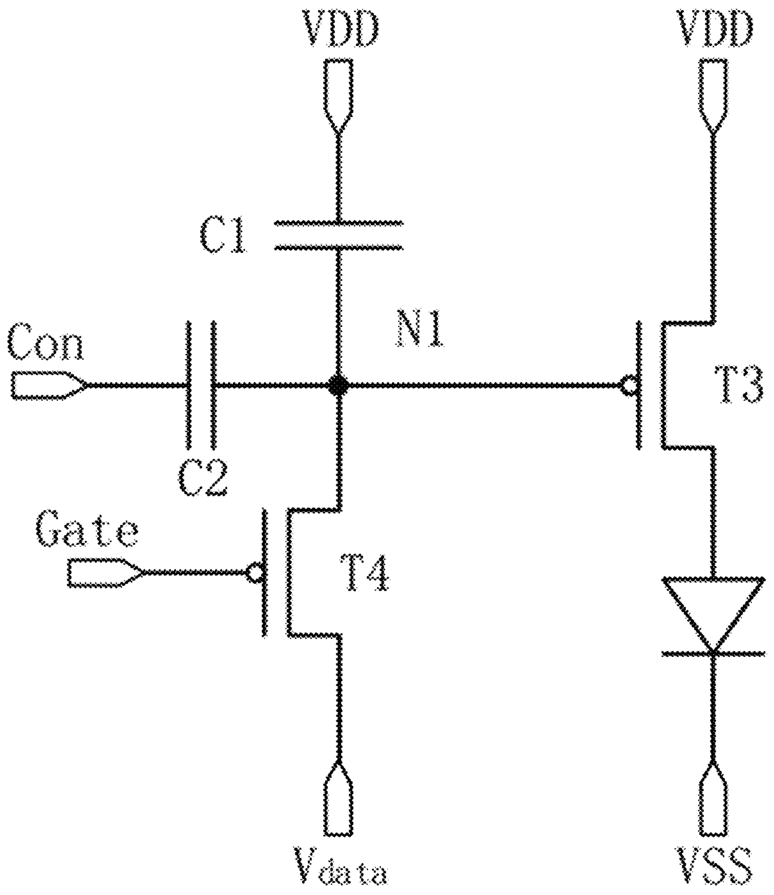
FIG. 1 is a schematic diagram of a structure of a pixel driving circuit according to an embodiment of the present disclosure.

Embodiments of the present disclosure are described below with reference to the accompanying drawings. It should be understood that the implementations set forth below reference to the accompanying drawings are exemplary descriptions for explaining the technical solutions of the embodiments of the present disclosure and are not limited to the technical solutions of the embodiments of the present disclosure.

It can be understood by those skilled in the art that unless otherwise specified, the singular forms "one", "a/an", "said", and "the" used herein may also include plural forms. It should further be understood that wording "include" used in the specification of the present disclosure refers to existence of feature, integer, step, operation, element, and/or component, but does not exclude implementation of one or more other features, integers, steps, operations, elements, components, and/or combinations thereof. It should be understood that when stating an element is "connected" or "coupled" to another element, the element may be directly connected or coupled to the another element, or the element and another element establish a connection relationship through an intermediate element. In addition, "connected" or "coupled" used herein may include wireless connection or wireless coupling. As used herein, the term "and/or" refers to at least one of the items defined by the term, e.g. "A and/or B" may be implemented as "A", or as "B", or as "A and B".

Implementations of the present disclosure will be described in further detail below with reference to the accompanying drawings and embodiments.

Firstly, several nouns related to this disclosure are introduced and explained.

L255 display apparatus refers to a display apparatus with gray level 256 (gray level 0 to 255). Gray scale is the so-called color scale or gray scale, which refers to a degree of lightness or darkness in brightness. For the L255 display apparatus, enough data voltage range is needed to ensure that each gray level has the corresponding degree of lightness or darkness.

For a cross-voltage between VDD and VSS, VDD refers to a positive voltage of a pixel driving circuit, VSS refers to a negative voltage of the pixel driving circuit, and the cross-voltage between VDD and VSS is a working cross-voltage of the pixel driving circuit.

Standard cross-voltage commonly uses a cross-voltage between VDD and VSS. Taking 1224×2700 OLED display apparatus as an example, a commonly used power supply voltage is: VDD being 4.6 V, VSS being −3.1 V; or VDD being 4.0 V and VSS being −3.7 V; or VDD being 3.5 V, VSS being −4.2V, etc.

For a display apparatus, how to reduce power consumption has been a research problem. For the OLED display scheme, one of the schemes for reducing power consumption is to reduce the cross-voltage between VDD and VSS. However, with the decrease of the cross-voltage between VDD and VSS, the data voltage range will be reduced, which makes some gray scales unable to be displayed. For example, in the L255 display apparatus, reducing the cross-voltage between VDD and VSS will reduce the data voltage required by L255, which may be a negative value, and in this case, the chip cannot correspond to the voltage and thus cannot display.

Taking 1224×2700 OLED display apparatus as an example, simulation data of standard cross-voltage and reduced cross-voltage are shown in Table 1.

TABLE 1

Simulation data of data voltage range for standard and reduced cross-voltage

| Vdd/Vss | 4.6 V/−3.0 V (standard cross-voltage) | | | 2.8 V/−2.8 V (reduced cross-voltage) | | |
|---|---|---|---|---|---|---|
| Pixel | R | G | B | R | G | B |
| $V_{data\ G255}$ | 3.85 V | 4.01 V | 3.30 V | 1.75 V | 1.99 V | 0.04 V |
| $V_{data\ G0}$ | 6.39 V | 6.39 V | 6.18 V | 4.63 V | 4.61 V | 4.42 V |
| $V_{data\ G0} - V_{data\ G255}$ | 2.54 V | 2.38 V | 2.88 V | 2.88 V | 2.62 V | 4.38 V |

VDD being 2.8 V and VSS being −2.8 V is only an exemplary illustration, and appropriate voltage values of VDD and VSS may be selected according to factors such as pixel arrangement and display panel size.

Please refer to Table 1, G0 refers to a gray scale of 0, G255 refers to a gray scale of 255, $V_{data\_G0}$ refers to a data voltage at the gray scale of 0, and $V_{data\_G255}$ refers to a data voltage at the gray scale of 255.

According to a comparison in Table 1, whether it is red sub-pixel R, green sub-pixel G or blue sub-pixel B, after the Vdd/Vss cross-voltage decreases, the data voltage V data at each gray scale decreases relative to the standard cross-voltage. Although in the simulation data of the embodiments given in Table 1, a negative value of the data voltage does not exist, in other examples, a negative value of the data voltage may exist. However, the drive chip of OLED display panel may only provide a positive data voltage, so when the data is provided according to the simulation results in Table 1 above, the voltage will result in abnormal displaying.

The technical solutions of the present disclosure will be described in detail below. It should be noted that the following implementations may be referred to, drawn upon, or combined with each other, and the same terms, similar features, similar implementation steps and the like in different implementations will not be described repeatedly.

An embodiment of the present disclosure provides a pixel driving circuit, as shown in FIG. 1. The pixel driving circuit according to this embodiment includes a writing transistor T4, a storage capacitor C1, a drive transistor T3, a coupling capacitor C2, and a light emitting unit (e.g. a light emitting diode).

A gate of the writing transistor T4 is configured to be electrically connected to a gate signal terminal gate, a first electrode of the writing transistor T4 is configured to be electrically connected to a data signal terminal $V_{data}$, and a second electrode of the writing transistor T4 is configured to be coupled to a first node N1, and the writing transistor T4 is configured to write a data voltage input from the data signal terminal $V_{data}$ to the first node N1 in response to a gate signal input from a gate signal terminal gate, such that a voltage of the first node N1 is a first voltage.

One plate of the storage capacitor C1 is configured to be electrically connected to a first power supply terminal (VDD in the figure), the other plate of the storage capacitor C1 is configured to be electrically connected to the first node N1, and the storage capacitor C is configured to store the voltage of the first node N1.

One plate of the coupling capacitor C2 is configured to be electrically connected to a control voltage terminal (Con in the figure), the other plate of the coupling capacitor C2 is configured to be electrically connected to the first node N1, and the coupling capacitor C2 is configured to adjust the voltage of the first node N1 during a light emitting stage, such that the voltage of the first node N1 is converted from the first voltage to a second voltage.

A gate of the drive transistor T3 is configured to be electrically connected to the first node N1, a first electrode of the drive transistor T3 is configured to be coupled with the first power supply terminal (VDD in the figure), a second electrode of the drive transistor T3 is configured to be coupled with one end of the light emitting unit, and the drive transistor T3 is configured to generate a drive current according to the second voltage and a first power supply voltage during the light emitting stage.

The other end of the light emitting unit is configured to be electrically connected to a second power supply terminal (VSS in the figure), and the light emitting unit is configured to emit light under driving of the drive current.

The drive current of the light emitting unit (OLED) is $i_{drive}=k\times(Vgs-Vth)^2$, where Vgs is a difference between a gate voltage Vg and a source voltage Vs of the drive transistor T3, Vth is a threshold voltage of the drive transistor T3, and k is a proportional constant (k is different in different pixel driving circuits).

During the light emitting stage, Vg is the voltage of the first node N1, and Vs is the voltage of the first power supply terminal Vdd, i.e. $i_{drive}=k\times(V_{N1}-Vdd-Vth)^2$. In the present disclosure, the voltage $V_{N1}$ of the first node N1 during the light emitting stage is the second voltage V2, i.e. $i_{drive}=k\times(V_2-Vdd-Vth)^2$. That is, the drive current required for emitting light with required brightness by the light emitting unit is $i_{drive}=k\times(V_2-Vdd-Vth)^2$, and only input data voltage is required such that the first node N1 is the first voltage in a data writing stage. Therefore, the effect of adjusting a value of the input data voltage may be achieved by providing the coupling capacitor C2.

The pixel driving circuit according to this embodiment can adjust the voltage of the first node N1 during the light emitting stage by providing the coupling capacitor C2 at the first node N1, such that the data voltage input into the pixel driving circuit by the drive chip may make the first node N1 be kept at the first voltage in the data writing stage, thereby solving a situation that the required data voltage caused by reducing the cross-voltage between VDD/VSS exceeds a data voltage range provided by the drive chip, and ensuring normal displaying of the OLED display apparatus.

In an exemplary embodiment, as shown in FIG. 1, in the pixel driving circuit according to this embodiment, both the writing transistor T4 and the drive transistor T3 are P-type transistors, and the coupling capacitor C2 is configured to pull down the voltage of the first node N1 during the light emitting stage in response to a voltage control signal. In this embodiment, P-type transistors are used as transistors of the pixel driving circuit of the OLED, and a conduction condition of the P-type transistor is that Vgs is less than a specific voltage, so it is necessary to pull down the voltage of the first node N1 during the light emitting stage.

Figure 2:
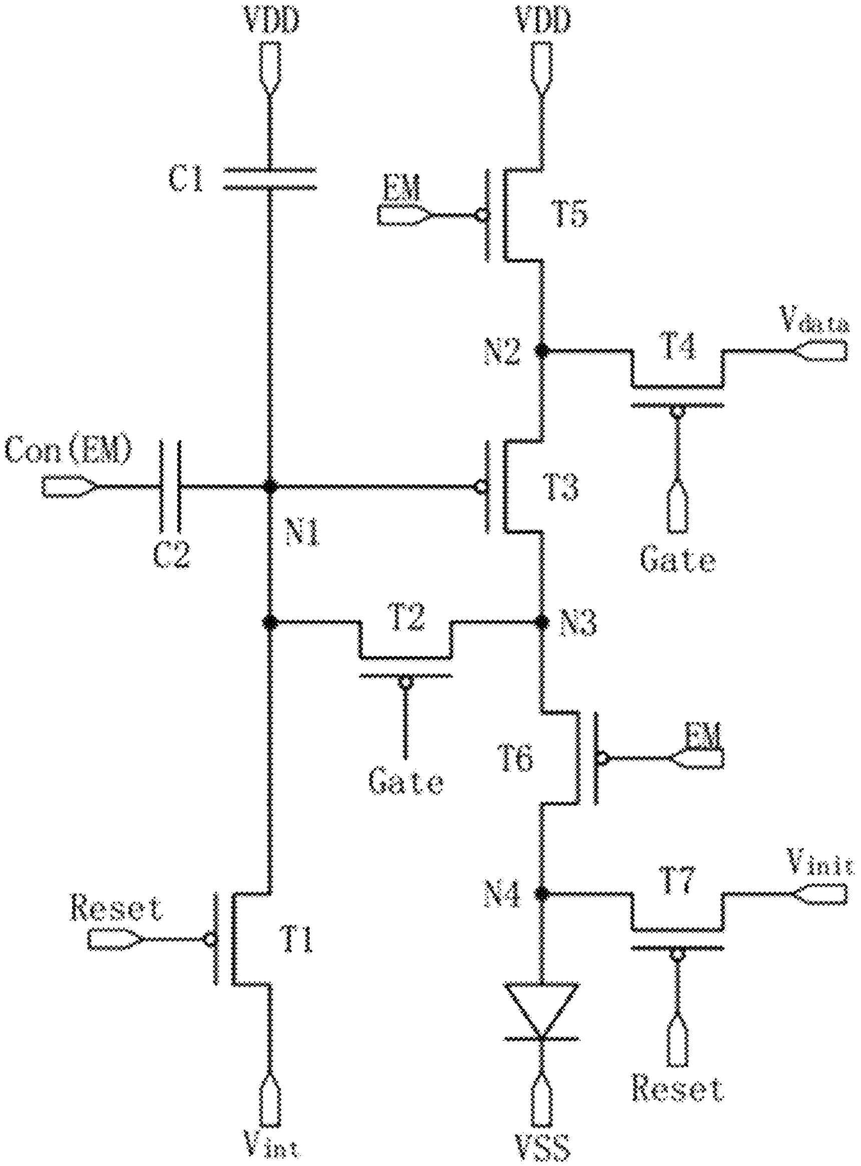
FIG. 2 is a schematic diagram of a structure of another pixel driving circuit according to an embodiment of the present disclosure.

In an exemplary embodiment, as shown in FIG. 2, the pixel driving circuit according to this embodiment further includes a first light emitting control transistor T5, a second light emitting control transistor T6, a switching transistor T2, a first reset transistor T1, and a second reset transistor T7.

A gate of the first light emitting control transistor T5 is configured to be electrically connected to a light emitting control terminal EM, a first electrode of the first light emitting control transistor T5 is configured to be electrically connected to the first power supply terminal VDD, a second electrode of the first light emitting control transistor T5 is configured to be electrically connected to a second node N2, and the first light emitting control transistor T5 is configured to be turned on in response to a light emitting control signal input from the light emitting control terminal EM to make a voltage of the first power supply terminal be written into the second node N2, wherein the second node N2 is electrically connected to the first electrode of the drive transistor T3.

A gate of the second light emitting control transistor T6 is configured to be electrically connected to the light emitting control terminal EM, a first electrode of the second light emitting control transistor T6 is configured to be electrically connected to a third node N3, a second electrode of the second light emitting control transistor T6 is configured to be electrically connected to a fourth node N4, and second light emitting control transistor T6 is configured to be turned on in response to the light emitting control signal to make a voltage of the third node N3 be written into the fourth node N4, wherein the third node N3 is electrically connected to the second electrode of the drive transistor T3, and the fourth node N4 is electrically connected to the first end of the light emitting unit.

A gate of the switching transistor T2 is configured to be electrically connected to the gate signal terminal gate, a first electrode of the switching transistor T2 is configured to be electrically connected to the first node N1, a second electrode of the switching transistor T2 is configured to be electrically connected to the third node N3, and the switching transistor T2 is configured to be turned on in response to the gate signal to make the voltage of the third node N3 be written into the first node N1.

A gate of the first reset transistor T1 is configured to be electrically connected to a reset control terminal Reset, a first electrode of the first reset transistor T1 is configured to be electrically connected to the first node N1, and a second electrode of the first reset transistor T1 is configured to be electrically connected to a reset signal terminal Vint, and the first reset transistor T1 is configured to be turned on in response to a reset control signal input from the reset control terminal Reset to make a reset voltage input from the reset signal terminal Vint be written into the first node N1.

A gate of the second reset transistor T7 is configured to be electrically connected to the reset control terminal Reset, a first electrode of the second reset transistor T7 is configured to be electrically connected to the fourth node N4, a second electrode of the second reset transistor T7 is configured to be electrically connected to the reset signal terminal Vint, and the second reset transistor T7 is configured to write the reset voltage into the fourth node N4 in response to the reset control signal.

In the pixel driving circuit according to this embodiment, the coupling capacitor C2 is added on the basis of 7T1C, so that the coupling capacitor C2 adjusts a potential of the first node N1 during the light emitting stage.

Figure 3:
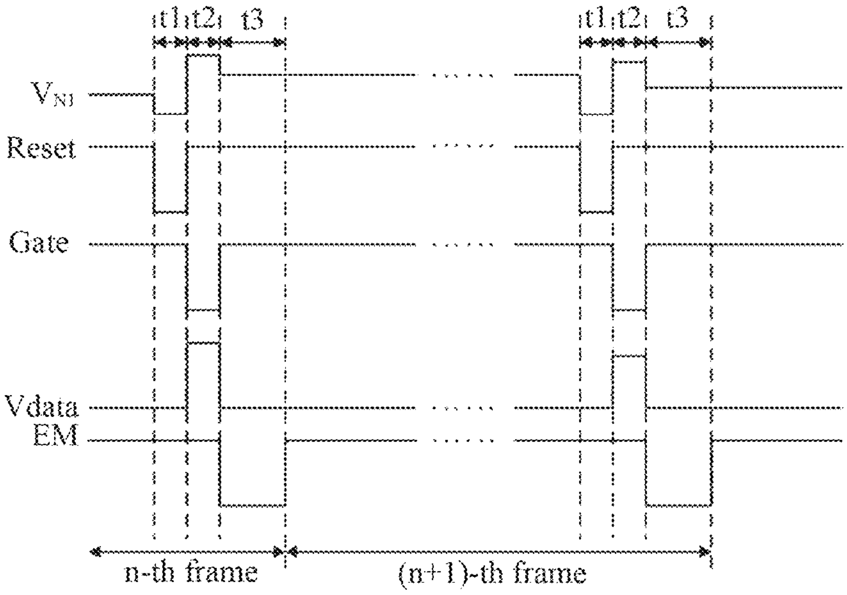
FIG. 3 is a timing diagram of a pixel driving circuit according to an embodiment of the present disclosure.

Further, as shown in FIGS. 2 and 3, in the pixel driving circuit according to the present this embodiment, the light emitting control signal is also used as the voltage control signal.

In an exemplary embodiment, when each transistor in the pixel driving circuit is a P-type transistor, the P-type transistors are turned on at a low level. As shown in FIG. 3, since the light emitting control signal EM is at a low level during the light emitting stage, the light emitting control signal EM is also used as the voltage control signal, which enables the potential of the first node N1 to be pulled down during the light emitting stage, that is, the first node N1 is pulled down from the first potential to the second potential.

For ease of understanding, a working process of the pixel driving circuit according to an embodiment of the present disclosure will be described below with reference to FIGS. 2 and 3.

As shown in FIGS. 2 and 3, in two consecutive frames (namely, an n-th frame and an (n+1)-th frame displayed pictures), the drive process of the pixel driving circuit shown in FIG. 2 includes a reset stage, a data writing stage and a light emitting stage, and a drive process of the n-th frame of displayed picture will be described below.

As shown in FIGS. 2 and 3, during the reset stage T1, the gate of the first reset transistor T1 receives a reset control signal at a low level to turn on the first reset transistor T1 so that the reset voltage is written into the first node N1, and the gate of the second reset transistor T7 receives a reset control signal at a low level to turn on the second reset transistor T7 so that the reset voltage is written into the fourth node N4. The reset voltage may be a reference voltage Vref.

As shown in FIGS. 2 and 3, during the data writing stage, the gate of the writing transistor T4 receives a gate signal (at a low level) to turn on the writing transistor T4 so that the data voltage is written into the second node N2; the gate of the switching transistor T2 receives a gate signal (at a low level) to turn on the switching transistor T2 so that the third node N3 and the first node N1 are turned on; and at this time, the gate electrode of the drive transistor T3 (the first node N1) is at the reset voltage (a low level) so that the drive transistor T3 is turned on, and the source electrode of the drive transistor T3 (the first electrode, i.e. the second node N2) is at a data writing voltage (a positive voltage) so that the data voltage is written into the third node N3. That is, the data voltage is written into the first node N1 via the second node N2 and the third node N3 sequentially. At this time, the light emitting control signal EM is at a high level, and the voltage of the first node N1 is the first voltage.

As shown in FIGS. 2 and 3, during the light emitting stage, the gate of the first light emitting control transistor T5 receives a gate signal at a low level to turn on the first light emitting control transistor T5; the gate of the second light emitting control transistor T6 receives a gate signal at a low level to turn on the second light emitting control transistor T6; the coupling capacitor C2 pulls down the voltage of the node N1 due to a coupling action at the moment when the gate signal is pulled down, even if the voltage of the first node N1 is pulled down from the first voltage to the second voltage; and at this time, the gate of the drive transistor T3 is at the second voltage, the source (the second node N2) is at a first power supply voltage, and a drive current is generated according to the second voltage and the first power supply voltage. The drive current is input to the light emitting unit so that the light emitting unit emits light according to the drive current.

In an exemplary embodiment, as shown in FIGS. 1 and 2, in the pixel driving circuit according to this embodiment, a capacitance value of the coupling capacitor C2 is greater than or equal to 2 fF. The capacitance value of coupling capacitor C2 is greater than or equal to 2 fF and less than or equal to 10 fF. That is, the capacitance value of the coupling capacitor C2 does not need to be too large to meet use requirements, which is easier to achieve in a manufacturing process.

In an exemplary embodiment, a simulation experiment is carried out by using a 1224×2700 OLED display apparatus under a condition that the VDD/VSS is 2.8 V/−2.8V, and the simulation data of the reduced cross-voltage is obtained as shown in Table 2. It should be noted that the data voltage shown in Table 2 is a data voltage required to be input from the data signal terminal Vdata.

TABLE 2

Data voltage simulation data table of different color sub-pixels under different coupling capacitance

| C2 (fF) | L255_R. | L255_G | L255_B | L0_R | L0_G | L0_B | ΔV_R | ΔV_G | ΔV_B |
|---|---|---|---|---|---|---|---|---|---|
| 0 | 1.75 | 1.99 | 0.04 | 4.63 | 4.61 | 4.42 | 2.88 | 2.62 | 4.38 |
| 1 | 2.1 | 2.3 | 0.92 | 4.87 | 4.84 | 4.66 | 2.77 | 2.54 | 3.74 |
| 2 | 2.39 | 2.57 | 1.46 | 5.1 | 5.07 | 4.89 | 2.71 | 2.5 | 3.43 |
| 3 | 2.66 | 2.81 | 1.84 | 5.33 | 5.29 | 5.12 | 2.67 | 2.48 | 3.28 |
| 4 | 2.91 | 3.05 | 2.15 | 5.54 | 5.5 | 5.34 | 2.63 | 2.45 | 3.19 |
| 5 | 3.15 | 3.28 | 2.43 | 5.76 | 5.7 | 5.55 | 2.61 | 2.61 | 2.42 |

As shown in Table 2, when the capacitance of the coupling capacitor C2 is 0 (i.e. there is no coupling capacitor C2) and the brightness is L255_B, the simulation data of the obtained data voltage is 0.04 V, which is too low, and there is a risk that the voltage will exceed an available data voltage range for the driver chip. With the increase of the capacitance of the coupling capacitor C2, the data voltages of different color sub-pixels under different brightness increase, so that the required data voltage can meet a data voltage range which can be provided by the drive chip.

ΔV_R is a data voltage range required by red sub-pixels, ΔV_G is a data voltage range required by green sub-pixels, and ΔV_B is a data voltage range required by blue sub-pixels. As shown in Table 2, a range of ΔV_B is quite different from those of ΔV_R and ΔV_G. Under the condition that the data voltage range that can be provided by the driver chip is unchanged, the greater the difference between the ranges of ΔV_B and ΔV_R, the smaller the adjustable ranges of ΔV_R and ΔV_G, and the more unfavorable it is to achieve high-accuracy brightness adjustment of red sub-pixels and green sub-pixels. However, with the increase of the capacitance of coupling capacitor C2, the difference between the ranges of ΔV_B and ΔV_R gradually decreases. Therefore, design of the coupling capacitor C2 with an appropriate capacitance can not only avoid the risk that the driver chip cannot provide a correct drive voltage, but also improve brightness adjustment accuracy of red sub-pixels and green sub-pixels under the condition that the data voltage range which can be provided by the chip remains unchanged, improving a quality of displayed pictures.

Moreover, a required capacitance value of the coupling capacitor C2 is small, so the purpose of increasing the capacitance of the coupling capacitor C2 can be achieved through a simple design on the basis of the current pixel driving circuit, that is, the technical solution according to the present disclosure has high feasibility.

Figure 4:
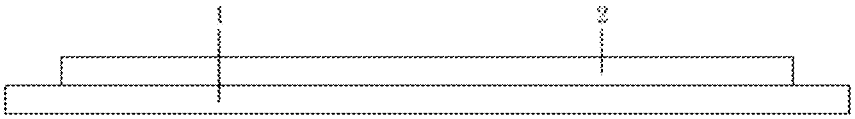
FIG. 4 is a schematic view of a structure of a display panel according to an embodiment of the present disclosure.

An embodiment of the present disclosure further provides a display panel. As shown in FIG. 4, the display panel according to this embodiment includes a base substrate 1 and a pixel driving circuit 2 located at a side of the base substrate 1. The pixel driving circuit 2 in this embodiment is the pixel driving circuit 2 in the above-described embodiment, and has the beneficial effect of the pixel driving circuit 2 in the above-described embodiment, which will not be repeated here.

In the display panel according to this embodiment, the structure of the pixel driving circuit 2 may be simply modified to achieve a purpose of increasing the capacitance of the coupling capacitor C2 at the first node N1. Since the pixel driving circuit 2 may adopt different layout designs, for convenience of explanation, only the position where the coupling capacitor C2 is formed will be described in detail below.

Figure 5:
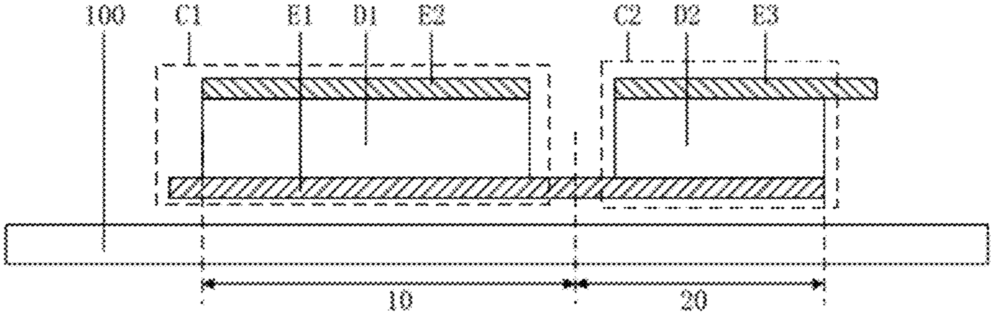
FIG. 5 is a schematic diagram of a structure at a position of a coupling capacitor in a display panel according to an embodiment of the present disclosure.

As shown in FIG. 5, the display panel according to this embodiment includes a multiplexing electrode E1, a storage electrode E2 and a coupling electrode E3. The multiplexing electrode E1 is located at a side of the base substrate 100 and includes a first region 10 and a second region 20. A first dielectric layer D1 is provided between the storage electrode E2 and the multiplexing electrode E1, the storage electrode E2 is located at a side of the multiplexing electrode E1 away from the base substrate 1, and an orthographic projection of the storage electrode E2 on the base substrate 1 is overlapped with an orthographic projection of the first region 10 of the multiplexing electrode E1 on the base substrate 1 to form a storage capacitor C1. A second dielectric layer D2 is provided between the coupling electrode E3 and the multiplexing electrode E1, the coupling electrode E3 is located at the side of the multiplexing electrode E1 away from the base substrate 1, and an orthographic projection of the coupling electrode E3 on the base substrate 1 is overlapped with an orthographic projection of a second region 20 of the multiplexing electrode E1 on the base substrate 1 to form a coupling capacitor C2.

As shown in FIG. 1 and FIG. 2, the storage capacitor C1 and the coupling capacitor C2 are both configured to be electrically connected to the first node N1. In the display panel, the coupling capacitor C2 and the storage electrode E2 share a multiplexing electrode E1, and a voltage on the multiplexing electrode E1 may be regarded as the voltage of the first node N1, that is, the storage capacitor C1 and the coupling capacitor C2 are both electrically connected to the first node N1, and the design of the multiplexing electrode E1 also ensures that a change of the layout of the pixel driving circuit 2 in the display panel is small and avoids complexity of the film layer.

Figure 6:
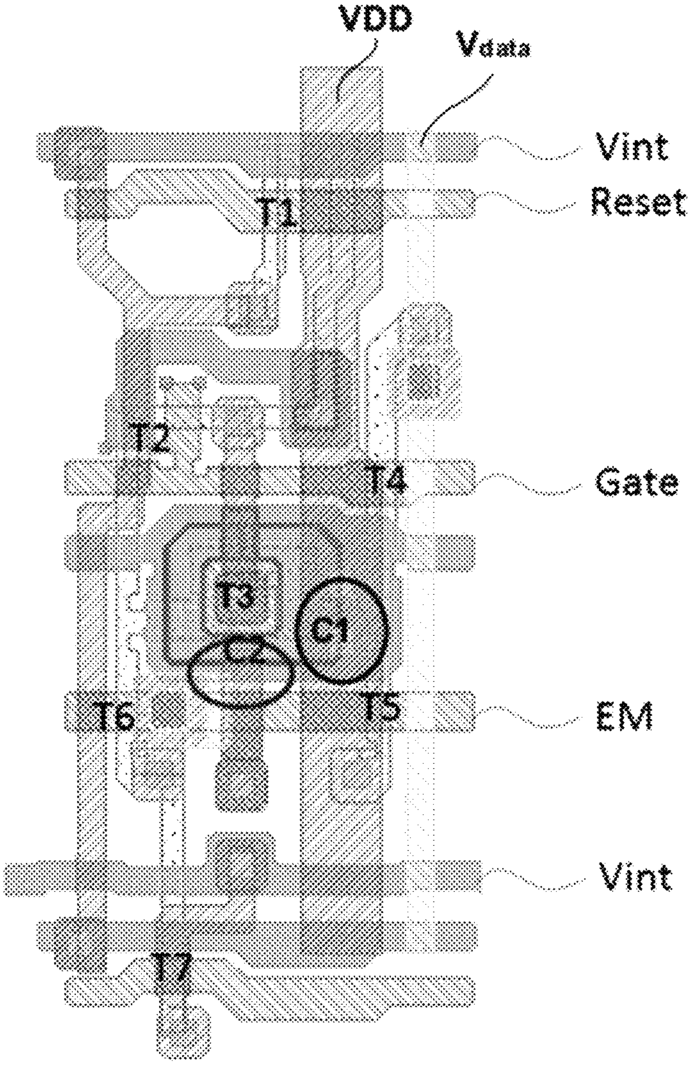
FIG. 6 is a layout of a coupled pixel driving circuit in a display panel according to an embodiment of the present disclosure.
Figure 7:
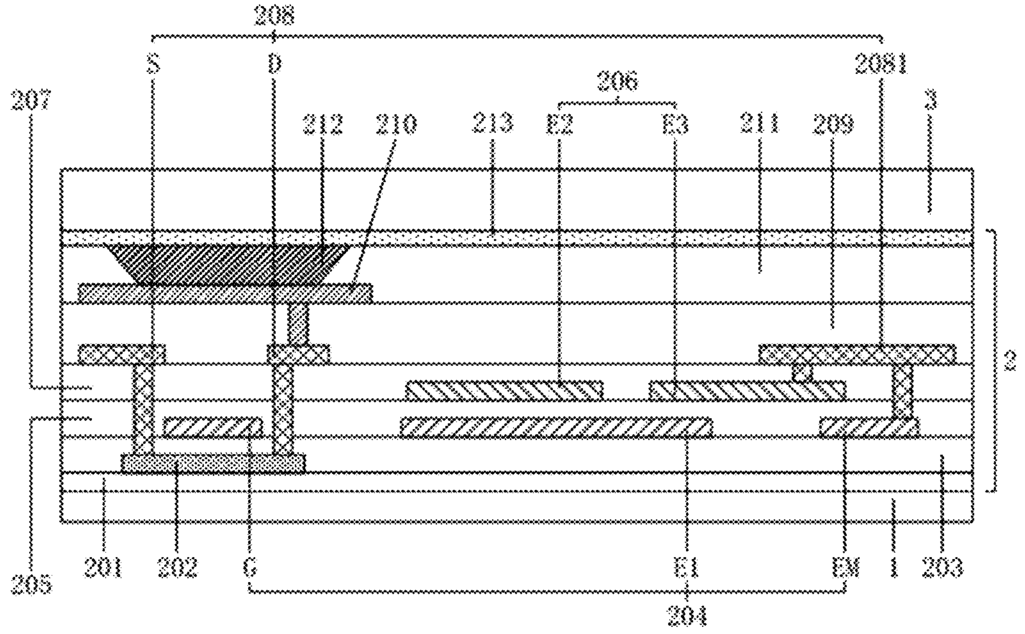
FIG. 7 is a schematic diagram of a structure at a position of a coupling capacitor in a display panel according to an embodiment of the present disclosure.

As shown in FIGS. 6 and 7, in one embodiment, the display panel includes an active layer 202, a first gate insulation layer 203, a first gate layer 204, a second gate insulation layer 205, and a second gate layer 206. The active layer 202 is located at a side of the base substrate 1. The first gate insulation layer 203 is located at a side of the active layer 202 away from the base substrate 1. The first gate layer 204 includes a plurality of gate lines gate, a plurality of light emitting control lines EM, and a plurality of multiplexing electrodes E1, and the gate lines gate and the light emitting control lines EM are alternately arranged. The second gate insulation layer 205 is located at a side of the first gate layer 204 away from the base substrate 1, and is simultaneously used as the first dielectric layer and the second dielectric layer. The second gate layer 206 includes a plurality of storage electrodes E2 and a plurality of coupling electrodes E3, and the coupling electrodes E3 are electrically connected to the light emitting control lines EM.

In the display panel according to this embodiment, the first gate layer 204 is provided with the multiplexing electrode E1, the second gate layer 206 is provided with the storage electrode E2 and the coupling electrode E3, and the second gate insulation layer 205 is simultaneously used as the first dielectric layer and the second dielectric layer, so that the purpose of increasing the capacitance of the coupling capacitor C2 at the first node N1 may be achieved without adding a film layer.

Further, as shown in FIGS. 6 and 7, the display panel according to this embodiment further includes an interlayer insulation layer 207 and a source-drain electrode layer 208. The interlayer insulation layer 207 is located at a side of the second gate layer 206 away from the base substrate 1. The source-drain electrode layer 208 includes a source electrode S, a drain electrode D, and a bridge portion 2081. The bridge portion 2081 is electrically connected to the coupling electrode E3 through a via hole penetrating through the interlayer insulation layer 207, and is electrically connected to the light emitting control line EM through a via hole penetrating through the interlayer insulation layer 207 and the first gate insulation layer 203. That is, an electrical connection between the light emitting control line EM and the coupling electrode E3 is achieved by providing the bridge portion 2081 in the source-drain electrode layer 208. Of course, the electrical connection between the light emitting control line EM and the coupling electrode E3 may be achieved in a different manner, for example, the electrical connection between the light emitting control line EM and the coupling electrode E3 is achieved through a via hole penetrating through the second gate insulation layer 205.

Figure 8:
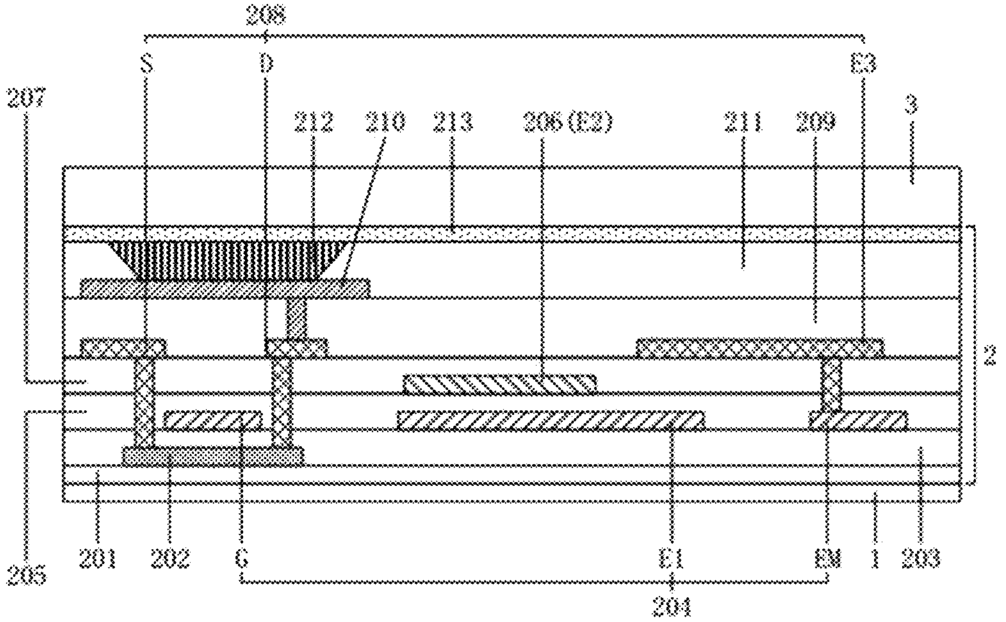
FIG. 8 is a schematic diagram of a structure at a position of another coupling capacitor is in a display panel according to an embodiment of the present disclosure.

As shown in FIGS. 6 and 8, in another embodiment, the display panel includes an active layer 202, a first gate insulation layer 203, a first gate layer 204, a second gate insulation layer 205, a second gate layer 206, an interlayer insulation layer 207, and a source-drain electrode layer 208.

The active layer 202 is located at a side of the base substrate 1. The first gate insulation layer 203 is located at a side of the active layer 202 away from the base substrate 1. The first gate layer 204 is located at a side of the first gate insulation layer 203 away from the base substrate 1, and includes a plurality of gate lines gate, a plurality of light emitting control lines EM, and a plurality of multiplexing electrodes E1, wherein the gate lines gate and the light emitting control lines EM are alternately arranged. The second gate insulation layer 205 is located at a side of the first gate layer 204 away from the base substrate 1 and is also used as a first dielectric layer. The second gate layer 206 includes a plurality of storage electrodes E2. The interlayer insulation layer 207 is located at a side of the second gate layer 206 away from the base substrate 1, and the interlayer insulation layer 207 and the second gate insulation layer 205 also used as a second dielectric layer. The source-drain electrode layer 208 includes a source electrode S, a drain electrode D, and a coupling electrode E3. The coupling electrode E3 is electrically connected to the light emitting control line EM through a via hole penetrating through the interlayer insulation layer 207 and the second gate insulation layer 205.

In this embodiment, the dielectric layer between the coupling electrode E3 and the multiplexing electrode E1 includes an interlayer insulation layer 207 and a second gate insulation layer 205, that is, the dielectric layer has a strong dielectric effect, which is beneficial to reducing an overlapping area between the coupling electrode E3 and the multiplexing electrode E1, thereby being beneficial to reducing influence of increasing the capacitance of the coupling capacitor C2 on squeezed layout space of the pixel driving circuit 2.

As shown in FIGS. 7 and 8, the display panel according to this embodiment may further include a buffer layer 201 located between the base substrate 1 and the active layer 202, and a planarization layer 209, an anode layer 210, a pixel definition layer 211, a light emitting layer 212, a cathode layer 213, and an encapsulation layer 3 which are arranged sequentially in a direction of the source-drain electrode layer 208 away from the base substrate 1. Herein, the anode layer 210 includes a plurality of anode units, and each of the anode units is electrically connected to a drain electrode (second electrode) of a drive transistor T3 in one of the pixel driving circuits 2, and each of the anode units, the cathode layer 213, and the light emitting layer 212 between the anode unit and the cathode layer 213 constitute a light emitting unit, and the cathode layer 213 is electrically connected to the second power supply terminal.

Figure 9:
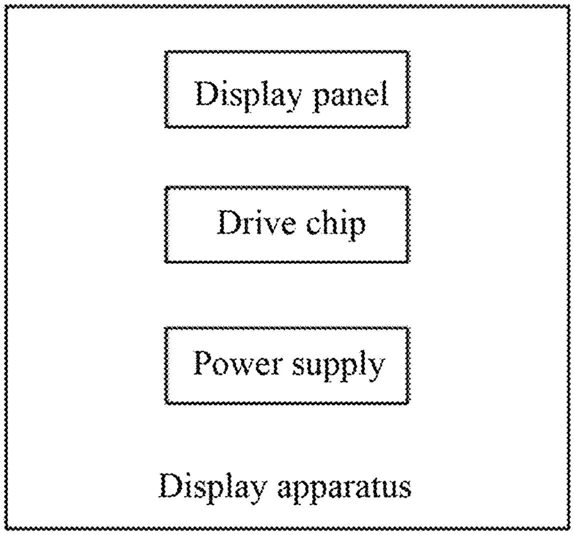
FIG. 9 is a schematic diagram of a structural framework of a display apparatus according to an embodiment of the present disclosure.

An embodiment of the present disclosure further provides a display apparatus, and as shown in FIG. 9, the display apparatus according to this embodiment includes the display panel in the above-described embodiment, which is beneficial to achieving the beneficial effect of the display panel in the above-described embodiment, which will not be repeated here.

As shown in FIG. 9, the display apparatus according to this embodiment further includes a drive chip and a power supply, wherein the drive chip provides a drive signal for the display panel, and the power supply provides electric energy for the display panel.

Figure 10:
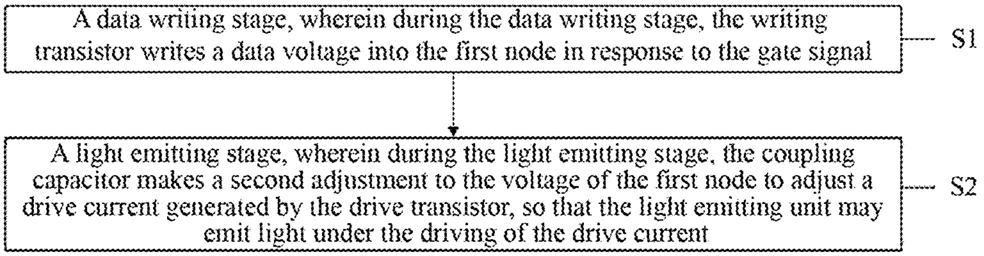
FIG. 10 is a schematic diagram of a flow of a driving method according to an embodiment of the present disclosure.

An embodiment of the present disclosure further provides a driving method for driving the pixel driving circuit in the above-described embodiment. Based on the pixel driving circuit 2 shown in FIG. 1, as shown in FIG. 10, the driving method according to this embodiment includes the following steps.

At S1, it is a data writing stage, and during the data writing stage, the writing transistor T4 writes a data voltage into the first node N1 in response to a gate signal.

At S2, it is a light emitting stage, and during the light emitting stage, the coupling capacitor C2 makes a second adjustment to the voltage of the first node N1 to adjust a drive current generated by the drive transistor T3, so that the light emitting unit may emit light under driving of the drive current.

The driving method according to this embodiment is used for driving the pixel driving circuit 2 in the above-described embodiment, and based on the adjustment effect of the coupling capacitor C2 in the pixel driving circuit 2 on the potential of the first node N1 during the light emitting stage, a situation that the required data voltage exceeds the data voltage range which can be provided by the drive chip can be avoided after the cross-voltage between VDD/VSS is reduced.

Further, as shown in FIG. 2, the driving method according to this embodiment further includes a voltage reset stage, during which the first reset transistor T1 writes a voltage reset voltage into the first node N1 in response to a reset control signal, and the second reset transistor T7 writes the voltage reset voltage into the fourth node N4 in response to the reset control signal. The voltage reset can eliminate influence of residual charge of the previous frame on the current frame and improve a display effect.

For ease of understanding, a working process of the pixel driving circuit 2 according to an embodiment of the present disclosure will be described below with reference to FIGS. 2 and 3.

As shown in FIGS. 2 and 3, in two consecutive frames (namely, an n-th frame and an (n+1)-th frame displayed pictures), the drive process of the pixel driving circuit 2 shown in FIG. 2 includes a reset stage, a data writing stage and a light emitting stage, and a drive process of the n-th frame of displayed picture will be described below.

As shown in FIGS. 2 and 3, during the reset stage t1, the gate of the first reset transistor T1 receives a reset control signal at a low level to turn on the first reset transistor T1 so that a reset voltage is written into the first node N1, and the gate of the second reset transistor T7 receives a reset control signal at a low level to turn on the second reset transistor T7 so that the reset voltage is written into the fourth node N4. The reset voltage may be a reference voltage Vref.

As shown in FIGS. 2 and 3, during the data writing stage t2, the gate of the writing transistor T4 receives a gate signal (at a low level) to turn on the writing transistor T4 so that a data voltage is written into the second node N2; the gate of the switching transistor T2 receives a gate signal (at a low level) to turn on the switching transistor T2 so that the third node N3 and the first node N1 are turned on; and at this time, the gate electrode of the drive transistor T3 (the first node N1) is at the reset voltage (at a low level) so that the drive transistor T3 is turned on, and the source electrode of the drive transistor T3 (the first electrode, i.e. the second node N2) is at a data writing voltage (positive voltage) so that the drive transistor T3 is turned on, which thus makes the data voltage be written into the third node N3. That is, the data voltage is written into the first node N1 via the second node N2 and the third node N3 sequentially. At this time, the light emitting control signal is at a high level, and the voltage of the first node N1 is a first voltage.

As shown in FIGS. 2 and 3, during the light emitting stage t3, the gate of the first light emitting control transistor T5 receives a gate signal at a low level to turn on the first light emitting control transistor T5; the gate of the second light emitting control transistor T6 receives the gate signal at a low level to turn on the second light emitting control transistor T6; the coupling capacitor C2 pulls down the voltage of the node N1 due to a coupling action at the moment when the gate signal is pulled down, even if the voltage of the first node N1 is pulled down from the first voltage to a second voltage; and at this time, the gate of the drive transistor T3 is at the second voltage, the source (the second node N2) is at a first power supply voltage, and a drive current is generated according to the second voltage and the first power supply voltage. The drive current is input to the light emitting unit so that the light emitting unit emits light according to the drive current.

Embodiments of the present disclosure may be applied to at least achieve the following beneficial effects:

The pixel driving circuit, the driving method thereof, the display panel and the display apparatus according to this embodiment can adjust the voltage of the first node during the light emitting stage by providing the coupling capacitor at the first node, such that the data voltage input into the pixel driving circuit by the drive chip can make the first node be kept at the first voltage in the data writing stage, thereby solving a situation that the reduction of the cross-voltage between VDD/VSS exceeds a data voltage range provided by the drive chip, and ensuring anormal displaying of the OLED display apparatus.

Those skilled in the art may understand that steps, measures and schemes in operations, methods, and the process already discussed in the present disclosure may be alternated, changed, combined or deleted. Further, other steps, measures and schemes in operations, methods and processes already discussed in the present disclosure may also be alternated, changed, rearranged, divided, combined or deleted. Further, steps, measures and schemes in the prior arts having the same functions with those in operations, methods and processes disclosed in the present disclosure may also be alternated, changed, rearranged, divided, combined or deleted.

In descriptions of the present disclosure, directions or positional relationships indicated by words “center”, “upper”, “lower”, “front”, “back”, “left”, “right”, “vertical”, “horizontal”, “top”, “bottom”, “inside”, “outside”, and the like are based on exemplary directions or positional relationships shown in the drawings, and are for convenience of describing or simplifying embodiments of the present disclosure, but are not intended to indicate or imply that a referred apparatus or components must have a specific orientation, or be constructed and operated in a particular orientation, and therefore they should not be construed as limitations on the present disclosure.

Terms “first” and “second” are only used for description and should not be construed as indicating or implying relative importance or implicitly indicating the number of indicated technical features. Therefore, features defined by “first” and “second” may explicitly or implicitly include one or more such features. In the descriptions of the present disclosure, “multiple” means two or more than two, unless otherwise specified.

The features, structures, materials, or characteristics described in the description may be combined in any one or more embodiments or examples in a proper way.

It should be understood that although steps in the flowcharts of the drawings are shown in the order as indicated by arrows, the order in which these steps are implemented is not limited to the order indicated by the arrows. Unless explicitly stated herein, in some implementation scenarios of embodiments of the present disclosure, the steps in the process may be performed in other order as required. Furthermore, based on the actual implementation scenario, some or all of the steps in the flowchart may include a plurality of sub-steps or a plurality of stages. Part or all of the sub-steps or stages may be executed at the same time or at different times, and under different scenarios of execution time, the execution sequence of these sub-steps or stages may be flexibly configured according to requirements, which is not limited in embodiments of the present disclosure.

The above is only part of the implementations of the present disclosure, and it should be noted that for those of ordinary skills in the art, without departing from the technical conception of the present disclosure, adopting other similar implementation means based on the technical idea of the present disclosure also belongs to the protection scope of embodiments of the present disclosure.

The invention claimed is:

1. A pixel driving circuit comprising:

a writing transistor, wherein a gate of the writing transistor is configured to be electrically connected to a gate signal terminal, a first electrode of the writing transistor is configured to be electrically connected to a data signal terminal, and a second electrode of the writing transistor is configured to be coupled to a first node, and the writing transistor is configured to write a data voltage input from the data signal terminal to the first node in response to a gate signal input from the gate signal terminal such that a voltage of the first node is a first voltage;

a storage capacitor, wherein one plate of the storage capacitor is configured to be electrically connected to a first power supply terminal, the other plate of the storage capacitor is configured to be electrically connected to the first node, and the storage capacitor is configured to store the voltage of the first node;

a coupling capacitor, wherein one plate of the coupling capacitor is configured to be electrically connected to a control voltage terminal, the other plate of the coupling capacitor is configured to be electrically connected to the first node, and the coupling capacitor is configured to adjust the voltage of the first node during a light emitting stage so that the voltage of the first node is converted from the first voltage to a second voltage;

a drive transistor, wherein a gate of the drive transistor configured to be electrically connected to the first node, a first electrode of the drive transistor configured to be coupled with the first power supply terminal, a second electrode of the drive transistor is configured to be coupled with one end of a light emitting unit, and the drive transistor is configured to generate a drive current during the light emitting stage according to the second voltage and a first power supply voltage input from the first power supply terminal;

the light emitting unit, wherein the other end of the light emitting unit is configured to be electrically connected to a second power supply terminal, and the light emitting unit is configured to emit light under driving of the drive current;

a first light emitting control transistor, wherein a gate of the first light emitting control transistor is configured to be electrically connected to a light emitting control terminal, a first electrode of the first light emitting control transistor is configured to be electrically connected to the first power supply terminal, a second electrode of the first light emitting control transistor is configured to be electrically connected to a second node, and the first light emitting control transistor is configured to be turned on in response to a light emitting control signal input from the light emitting control terminal to make the first power supply voltage be written to the second node, and the second node is electrically connected to the first electrode of the drive transistor;

a second light emitting control transistor, wherein a gate of the second light emitting control transistor is configured to be electrically connected to the light emitting control terminal, a first electrode of the second light emitting control transistor is configured to be electrically connected to a third node, a second electrode of the second light emitting control transistor is configured to be electrically connected to a fourth node, and the second light emitting control transistor is configured to be turned on in response to the light emitting control signal to make a voltage of the third node be written into the fourth node; wherein the third node is electrically connected to the second electrode of the drive transistor, and the fourth node is electrically connected to the first end of the light emitting unit;

a switching transistor, wherein a gate of the switching transistor is configured to be electrically connected to the gate signal terminal, a first electrode of the switching transistor is configured to be electrically connected to the first node, a second electrode of the switching transistor is configured to be electrically connected to the third node, and the switching transistor is configured to be turned on in response to the gate signal to make a voltage of the third node be written into the first node;

a first reset transistor, wherein a gate of the first reset transistor is configured to be electrically connected to a reset control terminal, a first electrode of the first reset transistor is configured to be electrically connected to the first node, a second electrode of the first reset transistor is configured to be electrically connected to a reset signal terminal, and the first reset transistor is configured to be turned on in response to a reset control signal input from the reset control terminal to make a reset voltage input from the reset signal terminal be written into the first node; and a second reset transistor, wherein a gate of the second reset transistor is configured to be electrically connected to the reset control terminal, a first electrode of the second reset transistor is configured to be electrically connected to the fourth node, a second electrode of the second reset transistor is configured to be electrically connected to the reset signal terminal, and the second reset transistor is configured to write the reset voltage into the fourth node in response to the reset control signal, wherein the light emitting control signal is also used as the voltage control signal.

2. The pixel driving circuit according to claim 1, wherein the writing transistor and the drive transistor are both P-type transistors, and the coupling capacitor is configured to pull down the voltage of the first node during the light emitting stage in response to a voltage control signal.

3. The pixel driving circuit according to claim 2, wherein a capacitance value of the coupling capacitor is greater than or equal to 2 fF.

4. The pixel driving circuit according to claim 1, wherein a capacitance value of the coupling capacitor is greater than or equal to 2 fF.

5. The pixel driving circuit according to claim 4, wherein the capacitance value of the coupling capacitor is less than or equal to 10 fF.

6. A display panel, comprising:

a base substrate; and the pixel driving circuit according to claim 1, which is located at a side of the base substrate.

7. The display panel according to claim 6, further comprising:

a multiplexing electrode located at a side of the base substrate and comprising a first region and a second region;

a storage electrode, wherein a first dielectric layer is provided between the storage electrode and the multiplexing electrode, the storage electrode is located at a side of the multiplexing electrode away from the base substrate, and an orthographic projection of the storage electrode on the base substrate is overlapped with an orthographic projection of the first region of the multiplexing electrode on the base substrate to form the storage capacitor; and a coupling capacitor, wherein a second dielectric layer is provided between the coupling electrode and the multiplexing electrode, the coupling capacitor is located at the side of the multiplexing electrode away from the base substrate, and an orthographic projection of the coupling capacitor on the base substrate is overlapped with an orthographic projection of the second region of the multiplexing electrode on the base substrate to form the coupling capacitor.

8. The display panel according to claim 7, further comprising:

an active layer located at a side of the base substrate;

a first gate insulation layer located at a side of the active layer away from the base substrate;

a first gate layer comprising a plurality of gate lines, a plurality of light emitting control lines and a plurality of multiplexing electrodes, wherein the gate lines and the light emitting control lines are alternately arranged;

a second gate insulation layer located at a side of the first gate layer away from the base substrate and also used as the first dielectric layer and the second dielectric layer; and a second gate layer comprising a plurality of storage electrodes and a plurality of coupling electrodes, wherein the coupling electrodes are electrically connected to the light emitting control lines.

9. The display panel according to claim 8, further comprising:

a planarization layer, an anode layer, a pixel definition layer, a light emitting layer, and a cathode layer which are arranged sequentially in a direction of the source-drain electrode layer away from the base substrate, wherein the anode layer comprises a plurality of anode units, each of the anode units is electrically connected to a second electrode of a drive transistor in one pixel driving circuit, and the cathode layer is electrically connected to the second power supply terminal.

10. The display panel according to claim 9, further comprising:

a buffer layer between the base substrate and the active layer; and an encapsulation layer located at a side of the cathode layer away from the light emitting layer.

11. The display panel according to claim 7, further comprising:

an active layer located at a side of the base substrate;

a first gate insulation layer located at a side of the active layer away from the base substrate;

a first gate layer located at a side of the first gate insulation layer away from the base substrate and comprising a plurality of gate lines, a plurality of light emitting control lines and a plurality of multiplexing electrodes, wherein the gate lines and the light emitting control lines are alternately arranged;

a second gate insulation layer located at a side of the first gate layer away from the base substrate and also used as the first dielectric layer;

a second gate layer comprising a plurality of storage electrodes;

an interlayer insulation layer located at a side of the second gate layer away from the base substrate, wherein the interlayer insulation layer and the second gate insulation layer are also used as the second dielectric layer; and a source-drain electrode layer comprising a source electrode, a drain electrode and a coupling electrode, wherein the coupling electrode is electrically connected to a light emitting control line through a via hole penetrating through the interlayer insulation layer and the second gate insulation layer.

12. A display apparatus, comprising the display panel according to claim 6.

13. A driving method, used for driving the pixel driving circuit according to claim 1, wherein the driving method comprises:

a data writing stage, wherein during the data writing stage, the writing transistor writes a data voltage into a first node in response to the gate signal; and a light emitting stage, wherein during the light emitting stage, the coupling capacitor makes a second adjustment to the voltage of the first node to adjust the drive current generated by the drive transistor, so that the light emitting unit emits light under the driving of the drive current.

14. The driving method according to claim 13, further comprising:

a voltage reset stage, wherein during the voltage reset stage, a first reset transistor writes a voltage reset voltage into the first node in response to a reset control signal, and a second reset transistor writes the voltage reset voltage into a fourth node in response to a reset control signal.

* * * * *